Patented June 25, 1940

2,205,659

UNITED STATES PATENT OFFICE 2,205,659

PROCESS FOR PRODUCING MAGNESIUM

Roy C. Kirk, Midland, Mich., assignor to The Dow Chemical Company, Midland, Mich., a corporation of Michigan No Drawing. Application September 29, 1939, Serial No. 297,111

10 Claims. (Cl. 75—67)

This invention relates to an improved process for the production of magnesium by the thermal reduction of magnesia-containing materials with carbon reducing agents.

It is known to prepare metallic magnesium by heating magnesia-containing ores with carbon reducing agents at elevated temperatures. In the process, the magnesium is liberated as a vapor, which may be withdrawn from the reduction zone and condensed.

It has now been found that this reduction process is catalyzed by the presence of a small proportion of a metal fluoride, especially fluorspar ($CaF_2$). That is, the presence of the fluorspar greatly increases the rate of evolution of magnesium vapors, thereby permitting a much higher percentage recovery of the magnesium in the ore charge within a reasonable length of time, and correspondingly reducing heating costs in the process. It has also been found that the accelerating effect of the fluoride is further increased markedly by the presence of one or more of the oxides lime ($CaO$), silica ($SiO_2$), and chromic oxide ($Cr_2O_3$) in the reduction charge.

In practice, the magnesia-containing ore, carbon reducing agent, and fluoride, or mixture of fluoride and one of the oxides mentioned, are heated together at a temperature sufficient to liberate the magnesium as a vapor, usually at 1400° C. or higher, and at atmospheric or reduced pressure, preferably below 25 millimeters of mercury absolute. The liberated vapor is then withdrawn and condensed to metallic magnesium.

Any magnesia-containing ore, such as calcined magnesite, calcined dolomite, calcined brucite, etc., may be employed in the process, and likewise any carbon reducing agent such as coke, graphite, or charcoal. The reducing agent is ordinarily used in a quantity at least equivalent to the magnesia in the ore. In so far as I am aware, any metal fluoride, e. g., copper fluoride, iron fluoride, sodium fluoride, magnesium fluoride, or silicon fluoride may be employed as catalyst, but fluorspar is to be preferred, both because of its cheapness and its greater effectiveness. The reduction charge may advantageously be formed into briquettes prior to the heating operation.

In the process of the invention, the metal fluoride should preferably be employed in a proportion between about 1 and about 15 per cent by weight of the total reduction charge. When less than 1 per cent is used, the catalytic effect is much reduced, and when more than 15 per cent is employed, the charge tends to become fluid or to "flux" at the reduction temperatures. Optimum results are attained when the fluoride is present as 2 to 5 per cent of the charge.

As mentioned, the oxides lime, silica, and chromic oxide all increase the effect of the fluoride. These oxides may be employed in widely varying proportions without materially affecting the improved result, or necessitating any change in the proportion of the fluoride based on the total charge. In general, lime is used in a quantity equivalent to between about 5 and about 60 per cent by weight of the total charge; it may be added as such, or may occur naturally in the magnesia-containing ore, as in calcined dolomite. Silica is usually employed in a quantity between about 5 and about 35 per cent by weight of the total charge, preferably 10 to 20 per cent, and chromic oxide in a proportion of 2 to 25 per cent of the total charge, preferably 4–10 per cent.

The following examples will illustrate the invention but are not to be construed as limiting its scope:

Example 1

A mixture of 300 parts by weight of finely divided magnesia, 127 parts of graphite powder, and 9 parts of fluorspar was formed into briquettes, using a tar binder. The briquettes were then heated to carbonize the tarry binder and further heated in a furnace maintained at a temperature of 1500° C. and at absolute pressure of 5–10 millimeters of mercury, for a two-hour period. Magnesium vapors were liberated at a rapid rate, and were removed from the furnace and condensed. A net yield of 50.2 per cent of the theoretical quantity of magnesium metal was obtained. When the experiment was repeated exactly, with the exception that the fluorspar was omitted from the charge, the yield of magnesium was only 32.2 per cent.

Example 2

A mixture of 300 parts by weight of magnesia, 127 parts of graphite, 17 parts of fluorspar, and 400 parts of lime was heated under the conditions of Example 1. A magnesium yield of 73.7 per cent was obtained.

Example 3

A mixture of 300 parts by weight of magnesia, 127 parts of graphite, 10 parts of fluorspar, and 48 parts of silica was heated as in Example 1. The yield of magnesium was 60.4 per cent of the theoretical.

Example 4

A mixture of 300 parts by weight of magnesia, 127 parts of graphite, 9 parts of fluorspar, and 28 parts of chromic oxide was heated according to the procedure of Example 1. The magnesium yield was 72.2 per cent.

Example 5

A mixture of 300 parts by weight of magnesia, 127 parts of graphite, 18 parts of fluorspar, 400 parts of lime and 54 parts of chromic oxide was heated as in Example 1. The yield of magnesium was 72.8 per cent of the theoretical.

It is to be understood that the foregoing description is illustrative rather than strictly limitative and that the invention is co-extensive in scope with the following claims.

The invention claimed is:

1. In a process for the production of magnesium by the thermal reduction of magnesia-containing material by means of carbon as reducing agent, the improvement which comprises carrying out the reduction in the presence of a metal fluoride.

2. In a process for the production of magnesium by the thermal reduction of magnesia-containing material by means of carbon as reducing agent, the improvement which comprises carrying out the reduction in the presence of a metal fluoride in such proportion that it represents between about 1 and about 15 per cent by weight of the total reduction charge.

3. In a process for the production of magnesium by the thermal reduction of magnesia-containing material by means of carbon as reducing agent, the improvement which comprises carrying out the reduction in the presence of a metal fluoride in such proportion that it represents between about 1 and about 15 per cent by weight of the total reduction charge and in the presence of at least one of the oxides lime, silica and chromic oxide.

4. In a process for producing magnesium, the steps which include heating a charge comprising a magnesia-containing ore, carbon as reducing agent in a proportion at least equivalent to the magnesia, and a metal fluoride in the proportion of between about 1 and about 15 per cent by weight of the total reduction charge, to a temperature sufficient to liberate the magnesium as a vapor, and withdrawing the said vapor and condensing it.

5. In a process for producing magnesium, the steps which include heating a charge comprising a magnesia-containing ore, carbon as reducing agent in a proportion at least equivalent to the magnesia, and fluorspar in the proportion of between about 1 and about 15 per cent by weight of the total reduction charge, to a temperature sufficient to liberate the magnesium as a vapor, and withdrawing the said vapor and condensing it.

6. In a process for producing magnesium, the steps which include heating a charge comprising a magnesia-containing ore, carbon as reducing agent in a proportion at least chemically equivalent to the magnesia, and fluorspar in a proportion between about 2 and about 5 per cent by weight of the total charge, at a temperature of at least 1400° C. to liberate magnesium as a vapor, and withdrawing the said vapor and condensing it.

7. In a process for producing magnesium, the steps which include heating a charge comprising a magnesia-containing ore, carbon as reducing agent in a proportion at least chemically equivalent to the magnesia, a metal fluoride in a proportion between about 1 and about 15 per cent by weight of the total charge and at least one of the oxides lime, silica and chromic oxide, to a temperature of at least 1400° C. to liberate magnesium as a vapor, and withdrawing the said vapor and condensing it.

8. In a process for producing magnesium, the steps which include heating a charge comprising a magnesia-containing ore, carbon as reducing agent in a proportion at least chemically equivalent to the magnesia, fluorspar in the proportion between about 2 and about 5 per cent by weight of the total charge and lime in the proportion of between about 5 and about 60 per cent by weight of the total charge, to a temperature of at least 1400° C. to liberate magnesium as a vapor, and withdrawing the said vapor and condensing it.

9. In a process for producing magnesium, the steps which include heating a charge comprising a magnesia-containing ore, carbon as reducing agent in a proportion at least chemically equivalent to the magnesia, fluorspar in the proportion between about 2 and about 5 per cent by weight of the total charge, and silica in the proportion between about 5 and about 35 per cent by weight of the total charge, to a temperature of at least 1400° C. to liberate magnesium as a vapor, and withdrawing the said vapor and condensing it.

10. In a process for producing magnesium, the steps which include heating a charge comprising a magnesia-containing ore, carbon as reducing agent in a proportion at least chemically equivalent to the magnesia, fluorspar in the proportion between about 2 and about 5 per cent by weight of the total charge, and chromic oxide in the proportion of between about 2 and about 25 per cent by weight of the total charge, to a temperature of at least 1400° C. to liberate magnesium as a vapor, and withdrawing the said vapor and condensing it.

ROY C. KIRK.